E. P. Russell.

Casting Wheels

No. 2,702. Reissued Jul. 30, 1867.

Witnesses:
W. H. Clayton
Jno. H. Mc Cutcheon

Inventor:
E. P. Russell
by Henry J. Clayton

N. PETERS, PHOTO-LITHOGRAPHER, WASHINGTON, D. C.

BEST AVAILABLE COPY

UNITED STATES PATENT OFFICE.

E. P. RUSSELL, OF MANLIUS, NEW YORK.

IMPROVED METHOD OF CASTING THE DRIVING-WHEELS OF HORSE-POWERS, HARVESTERS, &c.

Specification forming part of Letters Patent No. 49,439, dated August 15, 1865; Reissue No. 2,702, dated July 30, 1867.

*To all whom it may concern:*

Be it known that I, E. P. RUSSELL, of Manlius, Onondaga county, in the State of New York, have invented certain new and useful Improvements in the Mode of Casting the Driving-Wheels of Harvesters, Horse-Powers, &c.; and I do hereby declare that the following is a full and exact description thereof, reference being had to the accompanying drawings, and to the letters of reference thereon marked.

Figure 1:
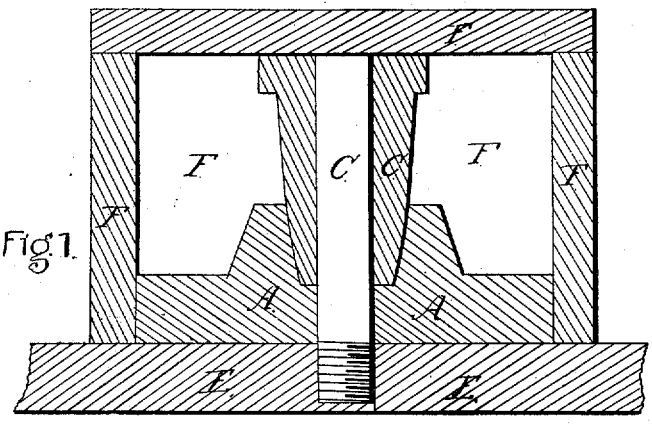
Figure 2:
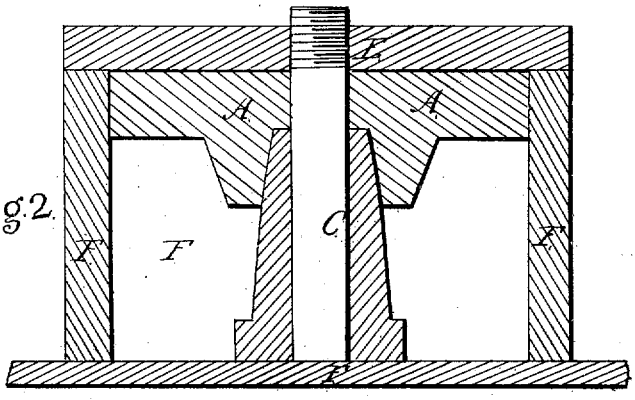
Figure 3:
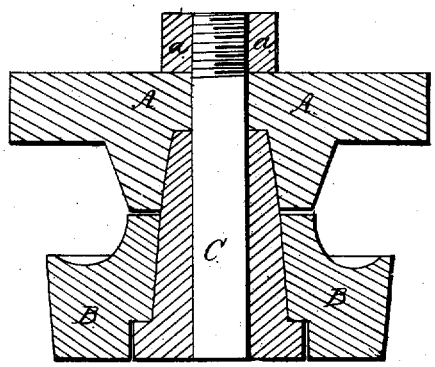

In the drawings, Figure 1 represents the pattern-face up (with the pins in it) on the mold-board. Fig. 2 represents the pins as they are placed in the flask or mold at the time of casting. That part of the drawing represented as wood is, in practice, of iron or sand. Fig. 3 shows the manner of attaching the friction-rollers to the driving-wheel after it is cast.

The nature of my invention consists in casting the driving-wheels of harvesters, horse-powers, and other similar machines around the pins of their friction-rollers, so as to dispense with the necessity of drilling the pin-holes; also in casting the pins and their holes in their friction-rollers with smooth chilled surfaces, the pins being formed of a wrought-iron pin with a surface of chilled iron cast around it.

In the drawings, A represents the driving-wheel. This wheel is some four feet in diameter, only a cross-section of it being shown in the drawings.

B is the friction-roller. Each driving-wheel is provided with some twenty of them, working on equidistant pins in the rim of the wheel.

C is the pin upon which the roller B plays. Its head is countersunk in the roller. The other end of the pin passes through wheel A, and is rigidly secured thereto by the nut *a*.

E represents the mold-board, F the sand and flask.

The friction-pulley B is cast upon a steel pin. When nearly cool, the pin is driven out by a blow of a hammer, so as to leave a smooth hard chilled hole for the pin C.

The pin C is cast or made as follows: I place a wrought-iron pin, having a thread on the upper end in a suitable metallic mold. The molten iron is then cast around the wrought pin, thus producing the pin C, which will then be of about an inch and a quarter in diameter, and will have a hard chilled smooth surface and a head to fill the countersunk hole of the pulley. This mode of casting the pins is more especially adapted to forming pins when used for the harvesters and horse-powers described in certain patents heretofore granted to me; but pins cast in this mode can be profitably used in many other machines, and for various purposes.

My improved mode of casting the wheel is as follows: I first take a driving-wheel pattern or a finished driving-wheel, and drill and countersink the necessary number of pin-holes at equal distances apart in it. I then place the pattern upon the mold-board E (see Fig. 1) face upward, and insert the pin C, as shown, in their holes. The mold is then filled with sand. I then turn the mold over (see Fig. 2) and withdraw the pattern very carefully, leaving the pins in their proper places in the sand and mold. The metal is then run into the mold, casting the wheel around all of the pins. By this means I am enabled to dispense with the necessity of the labor and expense of laying off and drilling a large number of holes in each cast-iron wheel, and at the same time I secure a better and a tighter fit of the pins in their holes. When the wheel is cool, it is removed from the mold. A slight blow of a hammer will drive them out of their chilled holes. As each pin is removed, it is put through a friction-pulley, B, and is then replaced in the same hole, and the nut *a* is then put upon the thread on the wrought-iron part of the pin and drawn up closely, so as to hold the pin immovably fast in the wheel. (See Fig. 3.) By my invention the pulleys having chilled holes working around chilled pins wear a much longer time and with less friction and at less cost than if the holes were drilled and the pins turned, and the pins are more uniformly equidistant and tighter in the wheel than would be the case if each wheel had to be measured and laid off and each hole drilled.

My invention relates simply to an improved mode of casting the driving-wheels, pins, and pulleys of a certain class of horse-powers and harvesters known as "Russell's Screw-Power Harvesters," in which the pulleys (which revolve on pins in the rim of the driving-wheel, communicate motion to a screw connected to the crank, by which mode I am enabled to produce a cheaper and better machine than I could prior to this invention.

I am aware that car-wheels have been cast around a metal pin, for the purpose of chilling the hub, and that rollers have been cast with a chilled cast-iron surface surrounding a center rod of wrought-iron. I therefore disclaim any intention to claim, broadly, such modes of casting wheels or rollers. But I am not aware that driving-wheels requiring a large number of pin-holes for stationary pins to fit in have ever been cast as described by me. I cast the wheel around the pins, not for the purpose of chilling the holes, but for the purpose of avoiding the labor of drilling so many holes, and because I secure a tighter fit of the pins in their respective holes.

Having fully described my invention, what I claim as new, and desire to secure by Letters Patent, is—

1. Placing the pulley-pins of driving-wheels in the sand or mold by means of a model driving-wheel, so as to secure equidistance between the pins, substantially as and for the purposes specified.

2. The combination of the driving-wheel A, the pin C, and the friction-roller B, constructed in the manner and arranged substantially as described.

In testimony that I claim the above I hereunto set my hand this 25th day of October, 1865.

E. P. RUSSELL.

In presence of—
JOSEPH BAKER,
MILLARD A. BAKER.